Dec. 28, 1948.  S. P. BIRD  2,457,523
QUICK DISCONNECT JOINT
Filed Dec. 14, 1946
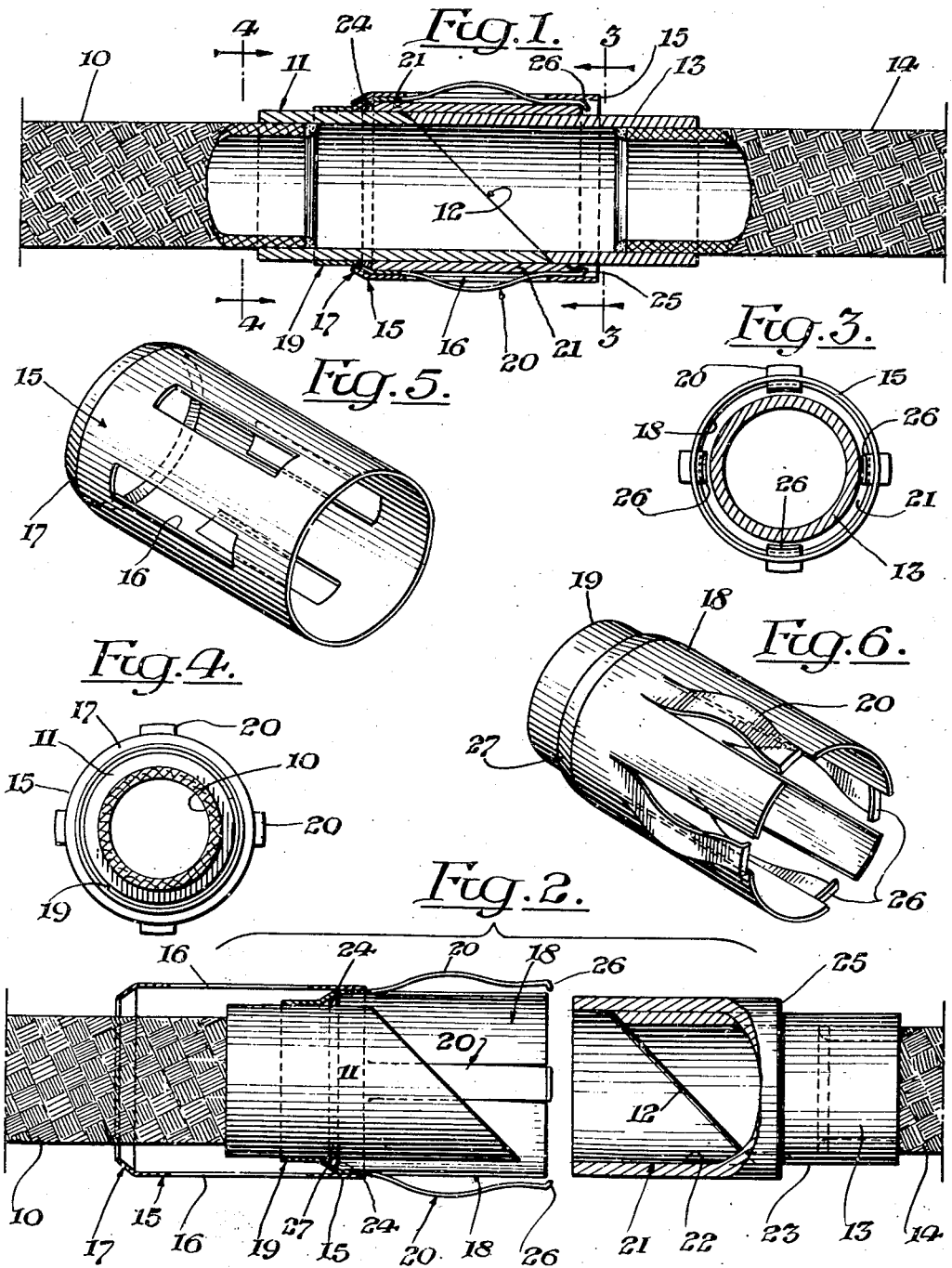
INVENTOR
Stanley P. Bird
BY
Cousins & Cousins
ATTORNEYS.

Patented Dec. 28, 1948

2,457,523

UNITED STATES PATENT OFFICE 2,457,523

QUICK DISCONNECT JOINT

Stanley P. Bird, Verona, N. J., assignor to Breeze Corporations, Inc., Newark, N. J., a corporation of New Jersey Application December 14, 1946, Serial No. 716,282

9 Claims. (Cl. 285—174)

This invention relates to disconnect assemblies for use with conduits, particularly such as are used for radio shielding purposes.

Where two sections of a radio shielding conduit are to be joined, it is essential that electrical leakage be reduced to a minimum so as to maintain the efficiency of the harness. It is also important that moisture be kept from entering the conduit where it might damage the leads therein.

Accordingly, it is an object of this invention to provide a quick disconnect assembly for a shielding conduit which will maintain high shielding properties at the coupling.

Another object of this invention is to provide a disconnect which will prevent water, gases or other foreign matter from entering the conduit.

A further object of this invention is to provide a quick disconnect assembly which may be easily and quickly assembled, and disconnected without the use of tools.

A feature of this invention is its simple construction and small number of parts.

Another feature of this invention is the large incline at which the ends of the connected tubes meet, which reduces electrical leakage therearound.

A further feature of this invention is the spring leaf construction which maintains the connection, locks itself in place, and permits of easy disassembly.

The invention consists of the construction, combination and arrangement of parts, as herein illustrated, described and claimed.

In the accompanying drawings, forming part hereof, is illustrated one form of embodiment of the invention, in which drawings similar reference characters designate corresponding parts, and in which:

Figure 1 is a longitudinal section of a complete embodiment of the invention.

Figure 2 is a view partly in elevation and partly cut away of the disassembled connection, with certain internal parts shown by dotted lines.

Figure 3 is a cross-section of the assembly, taken on line 3—3 of Figure 1.

Figure 4 is a cross-sectional view, taken on line 4—4 of Figure 1.

Figure 5 is a showing in perspective of the locking sleeve according to this invention.

Figure 6 is a view in perspective of the spring member which holds the coupling together.

Referring to the drawings, and particularly Fig. 1, 10 indicates a length of the well known shielding conduit, to the end of which has been attached, as by soldering, a ferrule of metallic tubing 11. The ferrule 11 is diagonally cut as indicated at 12, and the opposed section of the ferrule 13 attached to the opposed length of conduit. In this manner, when the two sections of the conduit 10, 14, are brought together, they will join along the diagonal cut 12 of the two ferrules 11, 13 in a construction which permits of less electrical leakage than if they met in a plane normal to their axes.

A sleeve 15 having a plurality of rectangular longitudinal slots 16 therein is slipped over the end of the conduit 10 for a hereinafter described purpose. The sleeve 15 is provided with an inwardly flared stop 17, at the left hand end thereof.

A spring member 18 having a reduced portion 19 at one end thereof, and a plurality of spring leaves 20, stamped from the body of the spring member, is secured to the end of the ferrule 11. The spring member 18 is positioned upon the ferrule 11 in such manner that the spring leaves 20 extend beyond the ferrule 11 in a direction of the opposed ferrule 13.

A short length of tubing 21 is secured to the end of the ferrule 13 and extends beyond it. The tube 21 has an inside diameter 22 equal to the outside diameter 23 of the ferrule 13. It is thus able to receive the ferrule 11 when the two ends of the conduit 10, 14 are brought together. A gasket 23, shown in Figures 1 and 2, is positioned between the spring member 18 and the ferrule 11 to protect the inside of the conduit from moisture, gas or other foreign matter.

When the two ends of the conduit 10, 14 are brought together, the faces of the ferrules 11, 13 meet along the diagonal cut 12, as previously described. The ferrule 11 slides within the guide tube 21, and the spring member 18 slips over the said guide tube 21. The spring leaves 20 of the spring member 18 are provided at their ends with inwardly turned detents 26 adapted to engage a shoulder 25 which is formed between the end of the guide tube and the outer surface of the tube 13. The sleeve 15 is then slid forward over the spring leaves 20 of the spring member 18 to compress them around guide tube 21 and force the detents 26 in against the shoulder 25. The forward travel of the sleeve is limited when the stop 17 butts against the shoulder 27 of the member 18, whereupon the sleeve 15 is rotated until the spring leaves 20 come into register with the longitudinal rectangular slots 16. When this happens the leaves 20 expand into the slots 16, as shown in Figure 1, and exert endwise pressure on the shoulder 25 which presses the surfaces meeting on cut 12 firmly together and compresses the gasket 24, thereby forming a sealed joint.

The novel operation of this spring leaf construction as used in conjunction with the sleeve 15, maintains the connection between the two lengths of conduit 10, 14, and locks the sleeve 15 in place. This construction also permits of easy disassembly of the coupling. In order to disconnect the assembly, it is merely necessary to slide the sleeve member 15 back upon the conduit 10, thereby releasing the spring leaves 20, and pull the coupling apart.

Having thus fully described the invention, what is claimed as new and desired to be secured by Letters Patent of the United States, is:

1. In a quick disconnect coupling, a pair of opposed ferrules, a guide tube attached to one of the said ferrules, a spring member attached to the other ferrule and a sleeve to secure the ferrules together by compressing the said spring member.

2. In a quick disconnect coupling, a pair of opposed ferrules, a guide tube attached to and extending beyond one of the said ferrules, a spring member attached to the other ferrule and a sleeve to secure the ferrules together by compressing the said spring member.

3. In a quick disconnect coupling, a pair of opposed ferrules, a guide tube attached to one of the said ferrules, a spring member having a reduced portion at one end thereof and provided with a plurality of spring leaves attached to the other ferrule and a sleeve to secure the ferrules together by compressing the said spring member.

4. In a quick disconnect coupling, a pair of opposed ferrules, a guide tube attached to one of the said ferrules, a spring member attached to the other ferrule and a pierced sleeve to secure the ferrules together by compressing the said spring member.

5. In a quick disconnect coupling, a pair of opposed ferrules, a guide tube attached to one of the said ferrules, a spring member attached to the other ferrule and a sleeve pierced longitudinally by a plurality of rectangular slots to secure the ferrules together by compressing the said spring member.

6. In a quick disconnect coupling, a pair of opposed ferrules provided with inclined contact faces, a guide tube attached to and extending beyond one of the said ferrules, a spring member having a reduced portion at one end thereof and provided with a plurality of spring leaves attached to the other ferrule and a sleeve pierced longitudinally by a plurality of rectangular slots to secure the ferrules together by compressing the spring leaves of said spring member.

7. In a quick disconnect coupling, a pair of opposed ferrules, a guide tube attached to one of the said ferrules, a spring member having a reduced portion at one end thereof and provided with a plurality of spring leaves, said leaves having inwardly turned detents at the ends thereof, attached to the other ferrule and a sleeve to secure the ferrules together by compressing the said spring member.

8. In a quick disconnect coupling, a pair of opposed ferrules provided with inclined contact faces, a guide tube attached to and extending beyond one of the said ferrules, a spring member having a reduced portion at one end thereof and provided with a plurality of spring leaves, said leaves having inwardly turned detents at the ends thereof, attached to the other ferrule and a sleeve pierced longitudinally by a plurality of rectangular slots to secure the ferrules together by compressing the spring leaves of said spring member upon the rearmost rim of the guide tube.

9. In a quick disconnect coupling, a pair of opposed ferrules, a guide tube attached to one of said ferrules, a spring member having a plurality of bowed-out portions attached to the other ferrule and a sleeve provided with a plurality of slots through which the bowed-out spring portions project to draw the meeting ends of the ferrules firmly together.

STANLEY P. BIRD.

REFERENCES CITED

The following references are of record in the file of this patent:

UNITED STATES PATENTS

| Number | Name | Date |
| --- | --- | --- |
| 1,347,660 | Reiband | July 27, 1920 |